3,385,866
PROCESS FOR PREPARING ORGANIC COMPOUNDS CONTAINING ONE OR A PLURALITY OF NITRILE GROUPS

Gerhard Lohaus, Kelkheim, Taunus, and Roderich Graf, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 29, 1964, Ser. No. 407,545
Claims priority, application Germany, Nov. 2, 1963, F 41,176
6 Claims. (Cl. 260—326.5)

For the preparation of nitriles various methods are known which, as far as they are not typical synthesizing reactions, are based, in general, on a chemical or thermal dehydration of carboxylic acid amides. A part of these known methods require rather severe conditions which easily provoke side reactions, if sensitive compounds are concerned.

Now we have found that organic compounds containing one or more nitrile groups can be prepared under extremely mild conditions by reacting organic compounds containing one or several times the grouping

linked to a carbon atom with acyclic or cyclic compounds containing one or more carboxylic acid amide groupings which may be mono- or disubstituted at the nitrogen atoms. In the above-mentioned formula X stands for a halogen atom. The process is operable in a temperature range between −30° C. and +120° C. It is of special advantage to operate at a temperature between about 0° and 50° C. The reaction is suitably carried out in the presence of solvents or diluents. Generally, the yields are very high and the reaction products are obtained in a very pure state.

Since the reaction according to the invention occurs only within the grouping —CO—NH—SO$_2$X, which is converted into the group —CN, the further structure of the radical on a carbon atom of which said grouping is linked, is not critical. The following working examples, in which said radical belongs to classes of compounds characterized by a saturated or unsaturated, aliphatic, cycloaliphatic, aromatic, araliphatic and heterocyclic nature with oxygen, sulfur and nitrogen atoms as hetero constituent, prove the general applicability of the process of the invention.

The carbonamide-N-sulfonic acid halides used as starting substances according to the invention, especially the chlorides, are easily accessible. The carbonamide-N-sulfonic acid chlorides, for instance, can be obtained from chlorosulfonyl-isocyanate by reaction with compounds containing replaceable hydrogen (Liebigs Ann. Chem. 661, 111 (1963)) or by reaction with carboxylic acids accompanied by elimination of CO$_2$ (German Patent 931,-225). Especially when using as starting substance a carboxylic acid as mentioned above, it is not necessary to isolate the carbonamide-N-sulfonic acid chloride that has formed. In most cases the reaction mixture thus obtained can directly be further treated in order to be converted into the nitriles. It is of special advantage to add, to the carboxylic acid dissolved or suspended in an inert solvent, one mol of chlorosulfonyl-isocyanate per carboxylic groups and to heat the mixture gently for a short period, for instance to 50° C., until the evolution of CO$_2$ is terminated. A carboxylic acid amide is then added to the reaction mixture and directly afterwards the nitrile prepared from the grouping —CO—NH—SO$_2$X according to the process of the invention is isolated by distillation or crystallization.

As compounds containing the carboxylic acid amide grouping and, therefore, being appropriate to convert the carbonamide-N-sulfonic acid halides into the corresponding nitriles, there are used, for instance, formamide, dimethyl-formamide, N-methyl-formanilide, diphenyl-formamide, diethyl-acetamide, N-acetyl-morpholine, N-butyryl-piperidine, acetic acid cyclohexylamide, benzoic acid dimethylamide, phenylacetic acid propylamide, furan-2-carboxylic acid dimethylamide, adipic acid bis-dimethylamide, sebacic acid bis-monobutylamide, N,N'-dipropionyl-hexamethylene-diamine, lactams, such as 4,4-dimethyl-acetidinone, α-pyrrolidone, N-methyl-α-pyrrolidone, caprolactam, as well as polyamides which are formed, for instance by polycondensation of diamines with dicarboxylic acids or lactams or likewise by polymerization of acrylamides, N-vinylamides or N-vinyl-lactams. Especially if the products of the invention are liquid and are to be distilled off directly, it is of special advantage to use compounds containing more than one carboxylic acid amide grouping in the molecule and are, therefore, hardly or not at all volatile. Although they generally react more slowly, there are likewise suitable for the reaction carbamic acid esters, for instance, N,N-dimethyl-carbamic acid ethyl ester, carbamic acid-n-butyl ester, as well as ureas such as urea or tetraethyl-urea.

It is surprising that amines such, for instance, as pyridine or triethylamine, when treated with N-carbonamide-sulfonic acid chlorides under the conditions of the process of the invention do not deliver the corresponding nitriles or deliver them only with small yields as side products. Since the carboxylic acid amide binds the halogen-sulfonic acid split off in the course of the reaction, it is advisable to use per mol of the grouping

of the starting compound used, at least the equivalent amount of carboxylic acid amide calculated on the carboxylic acid groupings. After the reaction is terminated, the amides can be recovered from the filtrate and used again by adding water and, if desired, by neutralizing the separated acid. Liquid amides which in most cases show a high dissolving power, for instance, dimethyl-formamide or N-methyl-pyrrolidone, are likewise directly suitable as solvents for the reaction according to the invention. When solid amides are used, the reaction is suitably performed in an inert solvent such as benzene, methylene chloride, carbon tetrachloride, acetonitrile nitromethane, tetrahydrofuran or tetramethylenesulfone. In many cases the halogensulfonic acid is split off so rapidly that the reaction can be maintained even in the presence of reactive diluents such, for instance, as alcohols or water.

With regard to the known processes for the preparation of nitriles, the present invention differs, in principle, as regards the formal course of the reaction and the facility with which the reaction is performed. It is surprising that the reaction is already terminated, in general, at 0° C. or at a considerably lower temperature within an extremely short period. A considerable advantage of the process consists in the fact that, due to the mild conditions and the specificity of the reaction other functional groups in the molecule are not involved. It is, however, likewise surprising that, for instance, the 2,4,6-trimethyl-benzonitrile can be prepared with the same facility by starting from the corresponding carbonamide-N-sulfonic acid chloride, since it is known that derivatives of 2,4,6-trimethyl-benzoic acid are very slow in reacting due to the strong steric hindrance. Compounds containing nitrile groups are much appreciated in many fields or organic chemistry as intermediate and final products.

The following examples serve to illustrate the invention but they are not intended to limit it thereto:

Example 1

5 grams of 2,4,6-trimethyl-benzamide-N-sulfonic acid chloride are dissolved in 4 grams of N-acetyl-morpholine. After 1 minute ice is added, the separated product is filtered off with suction and washed with water. 2.55 grams of 2,4,6-trimethylbenzonitrile melting at 55° C. are obtained corresponding to a theoretical yield of 92%.

Example 2

10 grams of pyrene-3-carbonamide-N-sulfonic acid chloride are dissolved in a mixture consisting of 10 grams of N-methylacetamide and 20 milliliters of tetrahydrofuran. The mixture is abandoned for 5 minutes at room temperature, cooled to −20° C., the precipitate is filtered off with suction and washed with methanol. The yield amounts to 5.9 grams of 3-cyanopyrene corresponding to 89% of the theory. Melting point 151° C.

Example 3

28.5 grams of thiophene-2-carbonamide-N-sulfonic acid chloride are dissolved while cooling in 20 milliliters of dimethylformamide. Ice is then added, the nitrile is taken up in methylene chloride, washed with water and distilled. At a boiling point of 77–78° C. under a pressure of 14 mm. of mercury 11.4 grams of 2-cyano-thiophene pass over, corresponding to a yield of 83% of the theory.

Example 4

5 grams of finely pulverized 2,4-dimethoxy-benzamide-N-sulfonic acid chloride are vigorously shaken for 15 minutes with 15 grams of formamide. Ice is then added, the precipitated 2,4-dimethoxybenzonitrile is filtered off with suction and washed with water. The yield of the compound amounts to 2.75 grams corresponding to 94% of the theory. The compound melts at 91° C.

Example 5

10 grams of anthracene - 9 - carbonamide-N-sulfonic acid chloride are rapidly dissolved at room temperature in 30 grams of N,N-dimethylbenzamide. Within a short period the separation of the nitrile sets in which is achieved after about 20 minutes by adding methanol and cooling the mixture to −20° C. by filtering with suction and after washing with methanol 6.0 grams of 9-cyano-anthracene is isolated which melts at 174° C. The yield amounts to 94% of the theory. Instead of the N,N-dimethyl-benzamide there can be used with the same success likewise a solution of adipic acid-bis-(N,N'-diethylamide) in tetrahydrofuran. If diphenyl-formamide in tetrahydrofuran is used, a short heating to 50° C. is required in order to arrive at comparable yields of nitrile.

Example 6

5 grams of 4-methyl-6-(p-tolyl)-α-pyrone-3-carbonamide-N-sulfonic acid chloride are quickly dissolved in 15 ml. of N-methyl-pyrrolidone. The solution becomes warm and after about 10 seconds the nitrile crystallizes out. Ice is added, the precipitate is filtered off with suction and washed with water. The yield of 3-cyano-4-methyl-6-(p-tolyl)-α-pyrone amounts to 3.26 grams, i.e. 99% of the theory. Melting point of the substance 226° C.

Example 7

45 grams of chlorosulfonyl-isocyanate are dropped with stirring into a solution of 34 grams of phenylacetic acid in 40 ml. of benzene. The mixture is then heated for 20 minutes to 70° C. It is cooled to room temperature and 37.5 grams of dimethylformamide are quickly dropped in, whereby the temperature rises to 50° C. The mixture is poured on ice, the layers are separated, the aqueous phase is shaken out again one time with benzene and the combined organic phases are distilled. At a boiling point of 109–111° C. under a pressure of 15 mm. of mercury 24.5 grams of benzyl-cyanide pass over, which represent a yield of 84% of the theory.

Example 8

40.3 grams of sebacic acid are portionwise added, with stirring to a solution of 60 grams of chlorosulfonyl-isocyanate in 100 milliliters of benzene, and the mixture is then heated for about 30 minutes to 60° C. until the evolution of $CO_2$ is terminated. It is then cooled to room temperature and 59 grams of dimethylformamide are quickly added. The formerly formed precipitate is completely dissolved thereby. It is poured on ice, the phases are separated, the aqueous layer is shaken out again with benzene and the combined benzene solutions are distilled. The yield of sebacic acid dinitrile melting at 153–155° C. under a pressure of 0.4 mm. of mercury amounts to 28 grams corresponding to 86% of the theory.

Example 9

A mixture of 156 grams of chlorosulfonyl-isocyanate and 150 milliliters of hexane is added dropwise while stirring to a solution of 128 grams of hexahydro-benzoic acid in 300 milliliters of hexane, while the temperature is maintained at 50° C. by cooling until the evolution of $CO_2$ is terminated. The mixture is further cooled to 10° C., 88 grams of dimethylformamide are dropped in within 5 minutes and stirring is continued for a further 20 minutes at room temperature. The mixture is then poured on ice, the layers are separated and distilled. 85 grams of hexahydro-benzonitrile are obtained boiling at 77–80° C. under a pressure of 12 mm. of mercury. The yield amounts to 78% of the theory.

Example 10

A solution of 105 grams of chlorosulfonyl-isocyanate in 100 milliliters of benzene is dropped within 20 minutes to a solution of 98.5 grams of succinic acid mono-ethyl ester in 150 milliliters of benzene. The mixture is heated to 50–60° C. until the evolution of $CO_2$ is terminated. 73 grams of dimethyl formamide are then dropwise added while cooling, the mixture is poured on ice, the organic phase is separated, dried with potassium carbonate and distilled. At a boiling point of 107–110° C. under a pressure of 15–16 mm. of mercury 61.5 grams of succinic acid monoethyl ester nitrile pass over. The yield amounts to 72% of the theory.

Example 11

112.2 grams of sorbic acid are dissolved in 200 milliliters of benzene and a mixture of 156 grams of chlorosulfonyl-isocyanate and 150 milliliters of benzene is dropwise added. A temperature of 40° C. is maintained by cooling until the evolution of $CO_2$ is terminated. While the cooling is continued 128 grams of α-pyrrolidone are added. The mixture is then poured on ice, the benzene layer is separated off, dried with sodium sulfate and distilled. The yield amounts to 71 grams of sorbic acid nitrile of a boiling point of 70–73° C. under a pressure of 15 mm. of mercury. The yield corresponds to 76% of the theory.

Example 12

243 grams of β-(pyrrolid-2-one-1-yl) - acrylamide - N-sulfonic acid chloride are portionwise introduced at 15–20° C. while cooling into 140 grams of dimethyl-formamide, whereby a clear solution is formed. It is poured on ice, the precipitate that forms is filtered off with suction and washed with cold water. A further part of the nitrile can be recovered by extraction of the aqueous solution with methylene chloride. The total yield of β-(pyrrolid-2-one-1-yl)-acrylonitrile amounts to 110 grams, corresponding to 84% of the theory. After recrystallization from ethanol the product melts at 90° C.

Example 13

A solution of 15 grams of 9-methyl-anthracene and 15 grams of chlorosulfonyl-isocyanate in 50 grams of acetonitrile is heated to the boil for 3 minutes. It is then cooled to room temperature and 10 grams of dimethyl-formamide are added. After 5 minutes it is cooled to −40° C., the precipitated crystals are filtered off with suction and washed with cold methanol. 12.5 grams of 9-methyl-10-cyano-anthracene are obtained representing a yield of 74% of the theory, calculated on the methyl-anthracene. The compound melts at 140° C.

The carbonamide-N-sulfonic acid chlorides used as starting materials in the Examples 1–6, 12 and 13 are obtained by reaction of chlorosulfonyl-isocyanate with compounds containing hydrogen atoms capable of being substituted.

We claim:

1. A process for preparing organic compounds containing at least one nitrile group, which comprises reacting (A) a saturated or unsaturated aliphatic, cycloaliphatic, aromatic pyrene, thiophene or pyrrolidone compound containing at least one grouping of the formula $$-CO-NH-SO_2X \qquad (1)$$

wherein X represents a halogen atom, which grouping is bound to a carbon atom, with (B) an acyclic or cyclic organic compound containing at least one carboxylic acid amide grouping in which the nitrogen is substituted by members of the group consisting of hydrogen and organic radicals.

2. A process as claimed in claim 1, wherein the amount of reactant (B) containing carboxylic acid amide groups is at least equivalent to the amount of reactant (A) having the groupings having the Formula 1.

3. A process as claimed in claim 1, wherein the reaction is carried out in the presence of an inert solvent.

4. A process as claimed in claim 1, wherein the reaction is carried out in the presence of a reactive diluent.

5. A process as claimed in claim 4, wherein the reaction is carried out in the presence of a member selected from the group consisting of water and lower alcohols.

6. A process for converting a saturated or unsaturated aliphatic, cycloaliphatic, aromatic, pyrene, thiophene or pyrrolidone, carbonamide-N-sulfonic acid chloride into the corresponding nitrile which comprises reacting it with a carbonamide group-containing compound selected from the group consisting of formamide, dimethyl formamide, amide, N-acetyl-morpholine, N-butyryl-piperidine, acetic acid cyclohexylamide, benzoic acid dimethylamide, phenylacetic acid propylamide, furan-2-carboxylic acid dimethylamide, adipic acid bis-dimethylamide, sebacic acid bis-monobutylamide, N,N′-dipropionyl - hexamethylene - diamine, lactams, polyamides, polyacrylamides, poly-N-vinylamides, poly-N-vinyl lactams, carbamic acid lower alkyl esters, urea and alkyl-substituted ureas.

References Cited

Karrer, "Organic Chemistry," 4th English ed., p. 187 (Elsevier) (1950).

JOHN D. RANDOLPH, *Examiner.*

WALTER A. MODANCE, *Examiner.*

R. BOND, *Assistant Examiner.*